Jan. 5, 1932.   C. R. ATEN   1,840,181
TRACTOR HITCH
Filed May 21, 1930   2 Sheets-Sheet 1
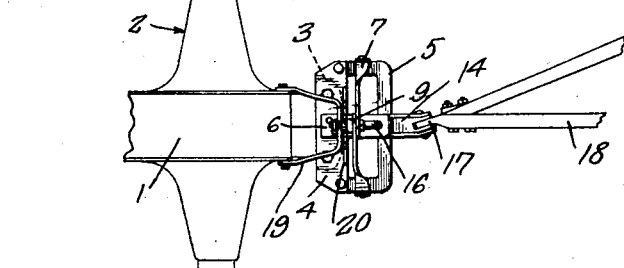
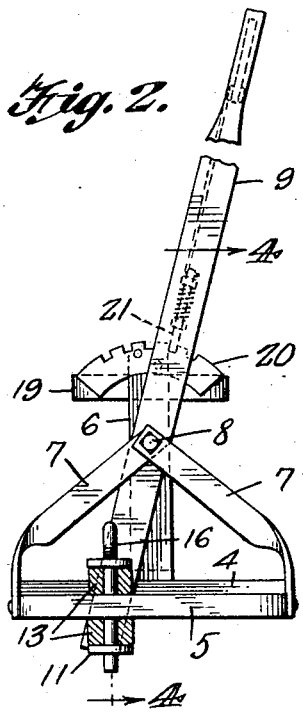
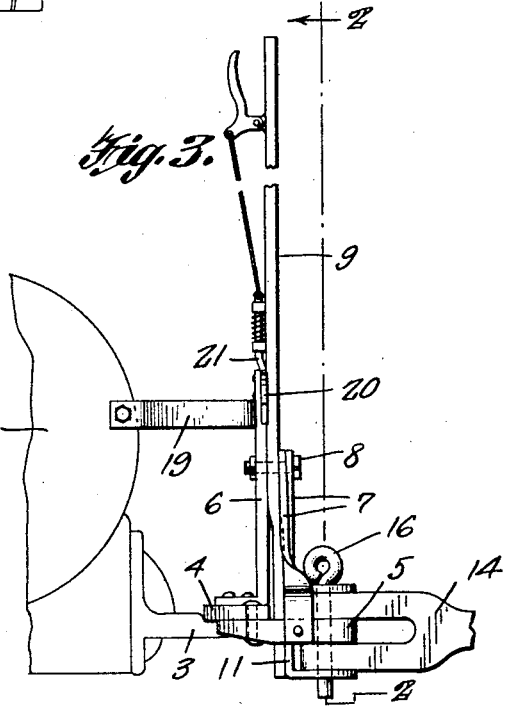
Charles R. Aten, INVENTOR
BY Victor J. Evans
ATTORNEY

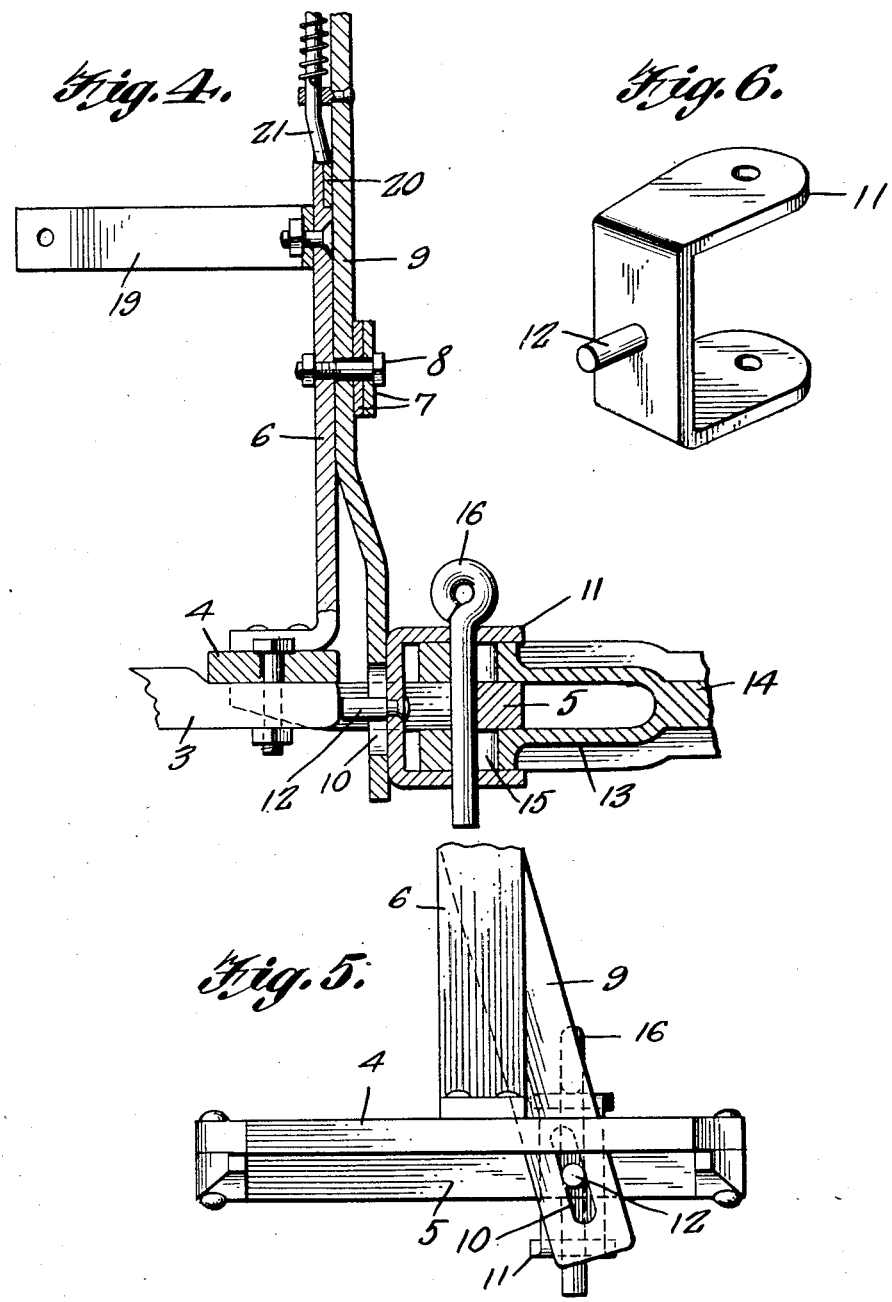

Patented Jan. 5, 1932

1,840,181

UNITED STATES PATENT OFFICE

CHARLES R. ATEN, OF BERWICK, PENNSYLVANIA

TRACTOR HITCH

Application filed May 21, 1930. Serial No. 454,489.

My present invention has reference to a tractor hitch and my object is the provision of a simple device of this character whereby the tractor hitch can be readily caused to assume and be held at any desired angle with respect to the tractor, wherein the construction, while simple is strong and effective to insure the plow following the tractor without liability of disorder to the plow, tractor or hitch, wherein the tractor may be backed with the plow without strain or stress upon the hitch and wherein the device may be readily attached to any ordinary tractors.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a plan view of a sufficient portion of a tractor and plow to illustrate the application of my improvement.

Figure 2 is a sectional view approximately on the line 2—2 of Figure 3.

Figure 3 is a side elevation of the improvement.

Figure 4 is an enlarged detail sectional view approximately on the line 4—4 of Figure 2.

Figure 5 is a perspective view of the yoke.

Figure 6 is a detail elevation looking toward the rear of the improvement detached.

In figures 1 and 3 of the drawings I have illustrated the differential housing 1 for the rear wheels of a tractor 2. The differential housing has bolted on its bottom and extending from its rear the usual cap provided with the draw bar 3. The draw bar 3 has bolted on the top thereof a transversely extending plate 4, and to the under face of this plate there is fixed at the ends of said plate the arms of a substantially U-shaped member 5. The plate and the U-shaped member provide a substantially rectangular frame.

There is fixed on the upper face of the plate 4, at approximately the center thereof and likewise fixed to the draw bar 3 of the tractor the offset end of an upstanding arm 6. Between this arm and the side of the U-shaped member 5 of the rectangular frame there are secured brace plates 7. A pivot 8, in the nature of a bolt engaged by a nut, passes through the upper end of the brace 7 and, of course, through the arm 6 and the said bolt affords a pivot for a lever 9. The lever extends through the opening in the rectangular frame and is provided, adjacent to its lower end with an elongated opening 10. The frame receives therein a yoke member 11, the arms of the yoke member being wider than the U-shaped member 5 of the frame, and the rear and connecting portion for the arms of the yoke carries a pin 12 which extends through the slot 10 and, when the lever is in one position, is in the path of contact with the outer end of the draw bar 3.

There is arranged upon the U-shaped member of the frame beneath the parallel arms of the yoke 11 arms 13 provided at the bifurcated end of a bar or clevis 14. The arms 13 are provided with elongated openings 15 and through these openings and through the parallel arms of the yoke 11 there is passed a removable pin 16. The outer end of the bar or clevis 14 is connected to the clevis 17 at the ends of a plow, the beams of the plow being shown in Figure 1 of the drawings and indicated by the numeral 18.

Between the outer end of the arm 6 and the sides of the differential housing 1 of the tractor there is fixed a substantially U-shaped brace member 19, the arms of the said member being, of course, connected to the sides of the housing 1. The arm 19 has on its upper end a segmental rack 20 and this rack is designed to be engaged by a spring influenced and hand operated dog 21 that is carried by the lever 9.

The lever 9 is, of course, disposed in close proximity to the rear of the seat of the tractor and can be readily grasped by one hand of the operator of the tractor. The lever upon the release of the dog 21 may be swung to various angles and such swinging of the lever will impart a longitudinal movement to the yoke 11 which, carrying the bar or clevis 14, will cause the plow to assume varying desired angles with respect to the tractor. A release of the lever and the dog 21 will lock the device and hold the plow at the desired angle. It is to be noted that there is little strain between the plow and the hitch. When the plow is to be backed with the tractor the lever is swung so that the pin 12 will be brought opposite the outer end of the draw bar 3 and the said draw bar will contact with this pin so that the tractor and the plow may be backed without inflicting injury to the hitch or to the plow.

It is believed the foregoing description when read in connection with the accompanying drawings will fully set forth the simplicity of my construction and the operation thereof to those skilled in the art to which such invention relates so that further detailed description will not be required.

Having described the invention, I claim:

A tractor hitch that includes a frame, whose rear portion is centrally fixed to the draw bar of the tractor, a yoke for movement in the frame, a bifurcated clevis received in the yoke and likewise received through the outer member of the frame and finding a bearing thereon, a pivot pin passing through the yoke and clevis and contacting with the inner face of the outer member of the frame, an upstanding arm on the rear of the frame, having a segmental rack on the upper end thereof, an upstanding lever having a lower slotted portion received through the frame, an abutment pin carried by the yoke, and passing through the slot of the lever, inwardly and upwardly directed angle brace members on the sides of the frame, an element securing the upper ends of the brace members to the upstanding arm and said element affording a pivot for the lever, and a hand operated spring influenced dog to engage with the rack carried by the lever.

In testimony whereof I affix my signature.

CHARLES R. ATEN.